3,256,098
METHOD FOR PRODUCING POWDERED OYSTER AND SHRIMP SOUP MATERIALS
Shinshiro Ohtaki, Tokyo, Japan, assignor to Nisshin Kako Kabushiki Kaisha, Tokyo, Japan, a corporation of Japan
No Drawing. Filed June 29, 1965, Ser. No. 468,109
4 Claims. (Cl. 99—124)

The present application is a continuation-in-part of copending patent application, Serial No. 163,879, filed January 2, 1962 (now abandoned).

The present invention relates to a method for producing powdered oyster and shrimp soup materials and to the products per se. These products have the inherent and characteristic taste of each particular raw material employed in the method of manufacture. The products are very easily preserved and are low priced in view of the economy of the manufacturing operation.

Generally speaking, soup making in the family kitchen is a very time-consuming and troublesome operation. Furthermore, it is difficult to prepare, all year round, a soup having a good taste from raw oyster and shrimp. This is due to the fact that the taste obtained has a close relationship to the catching season and freshness of the oyster and shrimp. To overcome the difficulties previously encountered, instant soup mixtures are often used in many restaurants as well as in homes. However, these previously known instant mixtures are not entirely satisfactory. Many concentrates or powders of broth and chicken soups prepared from meat and chicken, having relatively good taste and flavor can be found in the market. However, those prepared from good quality oyster or shrimp cannot be found in the market, due to difficulties involved in the treatment of the raw materials thereof.

For example, the taste and flavor of the broth consists mainly of peptides or amino acids which are the decomposition products of protein. Further, in the case of oyster or shrimp extracts, the taste and flavor thereof are effected by the taste and flavor of elements of the decomposition products of glycogen and nucleic acid. Furthermore, it is very important to a commercial product that the extracts have the flavor and color of the raw materials. Essentially, the composition of the general components of meats and fowls are different from oyster and shrimp. Also due to the histology, the length and water-holding capacity of muscle protein, as well as the contents of connective tissue of meats and fowls, are different from those of oyster and shrimp. The activities of enzymes, relating to the decomposition of protein such as cathepsin, in meats and fowls are different from those in oyster or shrimp. Therefore, velocities of and procedures for the protein decompositions by acid or enzyme are different in the two sources of proteins. Accordingly, in the case of preparing powdered extracts of raw oyster and shrimp, it is necessary to separate and catch the flavor, color and unstable ingredients before hydrolysis. Acid decomposition processes such as that generally used for preparing the broth extract cannot be employed for the oyster and shrimp extracts.

It is convenient to apply the powder of the present invention with a soup stock, not only in homes, but also in restaurants. Also, using the soup materials of the present invention, the soup makers can easily prepare instant soup mixtures having the taste and the flavor of oyster or shrimp.

The method of the present invention comprises the following steps:

(1) Raw oyster or raw or dried shrimp is sprinkled with 2–3% of sodium chloride based on the weight thereof and stirred. The viscous materials or other impurities on the surface thereof are washed out with waste.

(2) (Primary extracting step.) The resultant washed oyster or shrimp is boiled for a short time (10–15 minutes) in a boiling, dilute, aqueous sodium chloride solution (2–3%) which is adjusted to a slightly acidic condition (pH 5.5–6.0) by addition of a phosphate buffer solution. The oyster or shrimp is taken up immediately after said boiling, and the boiled solution is filtered.

(3) (Secondary extracting step.) The boiled oyster or shrimp is ground and a composition consisting of decomposing enzymes, consisting of mainly protease, prepared by extraction from a cultured medium of a microorganism with subsequent purification [for example, bacterial protease and mold protease: these are the proteolytic enzyme preparations which are extracted with ethanol from the cultured wheat gluten media of *Bacillus subtilis* var. *biotecus* and *Aspergillus oryzae* respectively, and they contain amylase, lipase and hemicellulase, etc. in addition to protease] together with a 2 to 3% solution of sodium chloride having the same composition as the primary extract are added to said ground oyster or shrimp. The mixture thus obtained is decomposed by the enzymes at pH 5.5–6.0 and at a temperature between 45° and 60° C., for 1–2 hours, the action of the enzymes is then stopped by heating at 90° C. for 10 minutes.

(4) The primary and secondary extracts are mixed together, and auxiliary ingredients such as soluble starch, condiments and antioxidants are added to the mixed extract and the mixture is treated in a homogenizer, dried to less than 8% water content by a spray-drying, drum drying, vacuum drying or freeze drying operation.

The features of the present invention will be more fully explained hereinafter.

The step, wherein raw oyster or shrimp is sprinkled with sodium chloride, stirred and washed with water, is necessary in order to remove impurities adhering to the raw materials and viscous matter on the surfaces of the raw material. The taste and flavor of the powdered extracts are impaired in the absence of this step. In the second step, the reasons for restricting the extraction duration to shorter than 15 minutes, the pH value to 5.5–6.0 and the concentration of sodium chloride solution to 2–3% are based on the fact that these conditions are necessary to obtain the taste and flavoring ingredients to the greatest extent possible, without, at the same time, losing the original taste and flavor of the raw materials. Sufficient and satisfactory extractions cannot be obtained in the absence of any one of said conditions.

In general, it is commonly known that a longer extraction duration results in the increase of the amount of the extract. On the other hand, degradation of flavor ingredients and coloring matter and also decomposition of taste ingredients are caused by the longer duration.

According to the present method, more than 80% of all the nitrogenous compounds which are soluble in hot water, more than 90% of all the free amino acid and more than 70% of nucleic acid relating materials are dissolved in the extracting solution. The extraction ratio of solid extracts was increased less than 5% when the boiling was continued for 60 minutes, and negative factors such as degradation of taste and flavor significantly increased.

The formation of hydrogen sulfide, which is caused mainly from decomposition of amino acid containing sulfur in the heating period of the primary extraction, is prevented by adjusting the pH of the extracting solution to 5.5 to 6.0 by the addition of a buffer solution. Thus the flavor and nutritive values of the extracts are prevented from being degradated by the hydrogen sulfide formation.

When the flesh of animals, fish and fowl are heated with water to above 60° C., volatile sulfide compounds generate. The amount of these volatile compounds is related to pH of the extracting solution, and the generated amount of hydrogen sulfide at pH 7.0 is larger by about 2-3 times that at pH 6.0.

The adjustment of pH in the secondary extraction is even more important. When a nitrogenous compound such as protein is decomposed with an enzyme, the reaction solution has a strong tendency to become neutral or alkaline together with the formation of basic amino acids, basic amines and ammonia etc. However, under conditions in which alkali protease becomes active, the enzyme causes bitter taste in many cases and heavily deteriorates the delicate taste and flavor. Accordingly, the pH range of 5.5-6.0 is the optimum condition for the present method employing the compounded protein decomposing enzyme preparations such as Takadiastase SS and Bioflase.

The significance of employing a 2-3% aqueous solution of sodium chloride lies in increasing the solubility of protein in the solution in the primary extraction stage and in adjusting the enzymatic decomposition of proteins together with pH in the secondary extraction.

The experimental results, comparing the extracting ratios with a 3% sodium chloride solution extract of the present invention with simple hot distilled water extracts of oyster, show an increase of the ratios of the extracted nitrogenous compounds by about 30% as shown in the following table.

TABLE 1
[The percentage being based upon the amount of the total nitrogen]

|  | Hot water extraction (percent) | Sodium chloride solution extraction (percent) |
|---|---|---|
| Soluble total nitrogen | 38.5 | 51.0 |
| Soluble protein nitrogen | 3.7 | 10.7 |
| Soluble non-protein nitrogen | 34.8 | 40.3 |

When the enzymatic decomposition is carried out without removing previously the main portions of flavor ingredients, nucleic acid materials and free amino acids by the primary extraction by means of the first extraction some of the useful ingredients are changed to unusable materials. This changing of the nucleic acids taste materials is especially rapid. According to results obtained, a longer period of time of the enzymatic decomposition than that specified in accordance with the present invention tends to cause a decrease in the amount of some free amino acid, such as arginine, lysine, threonine and cystine etc. (due to the Maillard reaction), coloration to brown, generation of hydrogen sulfide, odor of ammonia and other gases, as well as the lowering of the nutritive value.

The enzymatic action in the extracted solution is terminated by heating the solution at 90° C. for over 10 minutes. The extracts are admixed with soluble starch, sugar, salts, chemical condiments and antioxidants and the like under considerations in points of drying efficiency as well as stability, fluidity and hydroscopicity of the desired product. The product is then dried and pulverized.

As the means of drying the thus obtained product, any of freeze drying, drum drying and spray drying may be employed. In the case of freeze drying, the extract mixture is concentrated so as to contain 30-50% of the solid materials, and then the temperature of the product is lowered to below $-40°$ C. and dried at a temperature of below $-10°$ C., and the last drying temperature of the product is adjusted to below 40° C. When drum drying is employed, the dope (the extracts) may be flowed onto a drum having a surface temperature of 120° to 130° C. and rotating at about 2 revolutions per minute (r.p.m.). The conditions for the spray-drying are, for example, heated air having 140° to 150° C., a drying chamber temperature of 80° to 95° C., a nozzle diameter of 0.4 to 0.5 mm. and a pump pressure of about 2000 lbs./inch$^2$ in case of using a nozzle, or a diameter of about 250 mm. and rotation of 5,000 to 8,000 r.p.m. in case of using a disc.

*Example 1.—Oyster powder*

30 kilograms (kg.) of raw oysters are stirred gently with 0.7 kg. of sodium chloride and washed well with water. The oysters are put into 30 kg. of a boiling solution of 11 grams (g.) of disodium hydrogen phosphate, 73 g. of potassium dihydrogen phosphate, and 1 kg. of sodium chloride in water (pH 6.0), and boiled for 10 minutes. The oysters are taken from the broth, chopped by means of a chopper, ground by means of a grinder, mixed with a part of the broth (about 10 kg.) and 25 g. of bacterial protease, and allowed to stand at 55° C. for 90 minutes. The enzymatically decomposed mixture is mixed with the remainder of the broth (the first extract) and heated at 90° C. for 10 minutes to stop the enzymatic action. The mixture is filtered, 10 kg. of soluble starch are added along with 1.5 kg. of sodium chloride, 1 kg. of monosodium glutamate, 5 g. of sodium succinate, 1 g. of BHA (butyl hydroxyanisole) and 1 g. of BHT (dibutylhydroxytoluene), and 10 ml. of vinegar. The whole is sterilized at 80° C. for 10 minutes, and then passed through a homogenizer. The mass is dried by spraying the homogenized mixture from a nozzle under a pump pressure of about 2,000 lbs./inch$^2$ using heated air having the temperature of 145° C. and a drying chamber temperature of 90° C. to yield 13 g. of a powdery product.

*Example 2.—Shrimp extract powder*

40 kg. of dried shrimps are further dried to 32 kg. The mass is then ground, and placed in a jacketed kettle. Thirty kilograms of a solution of 22 g. of disodium hydrogen phosphate, 146 g. of potassium dihydrogen phosphate and 0.5 kg. of sodium chloride in water is added thereto, and the mixture is boiled for 30 minutes, followed by filtration. The residue is mixed with 10 kg. of the same aqueous saline solution as that mentioned above and 200 g. of mold protease, and the mixture is maintained at 45° C. for 2 hours, allowing enzymatic decomposition to take place. Then, the mixture is boiled for 10 minutes for decomposition of the enzyme, filtered, and mixed with the first broth to give 20 kg. of the total broth. To the mixture there is added 10 kg. of soluble starch, 150 g. of sodium glutamate, and 15 g. of sodium succinate. The mixture is sterilized at 80° C. for 10 minutes, and dried on a drum of 1 meter diameter having a surface temperature of 120° C. and rotating at 2 r.p.m., to yield 11.5 kg. of the powder product. A similar product is obtained when 200 kg. of raw shrimps are stirred gently with 4 kg. of sodium chloride, washed well with water, and the mass ground and treated in the same manner as the dried shrimp mass.

Analytical results of the components of the products obtained in Examples 1 and 2 are set forth below.

TABLE 2

| Component | Oyster | | Shrimp | |
|---|---|---|---|---|
|  | Fresh | Extract | Fresh | Extract |
| Moisture | 79.6 | 5.93 | 86.0 | 7.89 |
| Protein | 10.0 | 19.72 | 11.5 | 25.25 |
| Fat | 3.6 | 1.11 | 0.7 | 1.62 |
| Carbohydrate | 5.1 | 49.76 | 0.7 | 54.00 |
| Ash | 1.7 | 23.48 | 1.1 | 11.24 |
| Starch |  | 46.75 |  | 47.80 |
| NaCl |  | 18.86 |  | 6.75 |

What I claim is:
1. A method for producing powdered soup materials from a raw material selected from the group consisting of raw oyster and raw or dried shrimp which comprises:
   (1) mixing the raw material with sodium chloride, stirring the mixture and then washing with water;
   (2) boiling said washed material for a period of time shorter than 15 minutes in a boiling dilute aqueous sodium chloride solution of from about 2 to 3% concentration which is adjusted to a pH of about 5.5 to 6.0 by adding a phosphate buffer solution thereto, and filtering the material immediately after said boiling;
   (3) grinding the filtered cake, adding a compounded decomposing enzyme preparation consisting mainly of protease and a dilute sodium chloride solution having the same composition as that employed in the second step, maintaining the mixture thus obtained at pH 5.5 to 6.0 at a temperature between 45° and 60° C. for 1 to 2 hours, and then stopping the action of the enzymes by heating at 90° C. for 10 minutes; and
   (4) admixing the extracts obtained in the foregoing steps and adding auxiliary ingredients to the mixture, treating the mixture in a homogenizer and drying the homogenized mixture.

2. A method according to claim 1, wherein said raw material is raw oyster.

3. A method according to claim 1, wherein said raw material is dried shrimp.

4. A method according to claim 1, wherein the boiling according to paragraph (2) thereof is carried out for 10 to 15 minutes.

References Cited by the Examiner
UNITED STATES PATENTS

| | | | |
|---|---|---|---|
| 1,165,925 | 12/1915 | Watkins-Pitchford | 99—208 X |
| 1,642,209 | 9/1927 | Kahn | 99—112 X |
| 2,941,888 | 6/1960 | Dolman | 99—125 |
| 2,953,456 | 9/1960 | Mohler et al. | 99—110 X |

FOREIGN PATENTS 11,487  1/1928  Australia.

A. LOUIS MONACELL, *Primary Examiner.*

J. M. GOLIAN, *Assistant Examiner.*